Figure 1A:
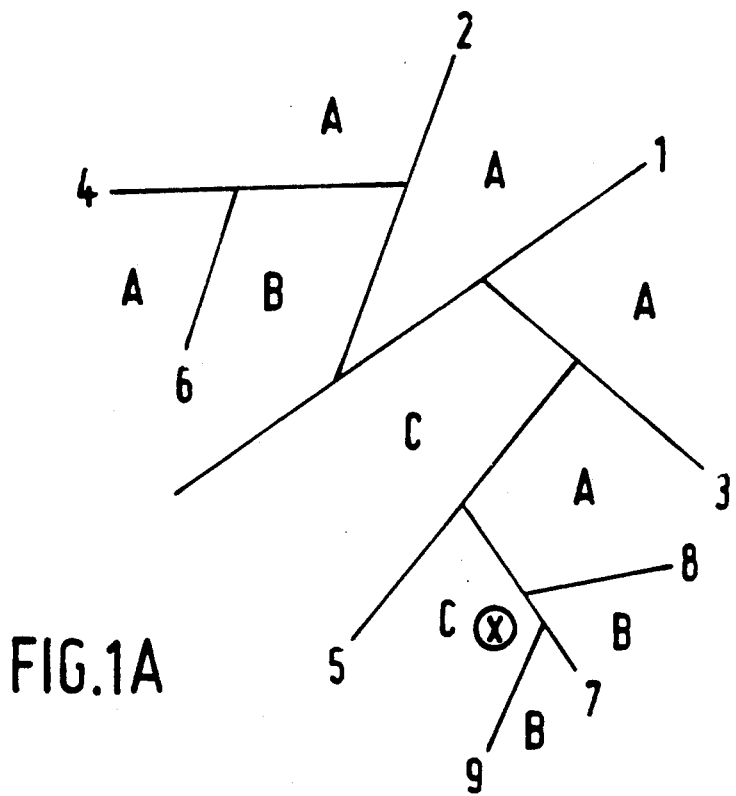

United States Patent [19]

Sirat et al.

[11] Patent Number: 5,218,646
[45] Date of Patent: Jun. 8, 1993

[54] CLASSIFICATION PROCEDURE IMPLEMENTED IN A HIERARCHICAL NEURAL NETWORK, AND HIERARCHICAL NEURAL NETWORK

[75] Inventors: Jacques-Ariel Sirat, Limeil-Brevannes; Jean-Pierre Nadal, Gentilly, both of France

[73] Assignee: U.S. Philips Corp., New York, N.Y.

[21] Appl. No.: 653,595

[22] Filed: Feb. 8, 1991

[30] Foreign Application Priority Data

Feb. 9, 1990 [FR] France .................... 90 01529

[51] Int. Cl.$^5$ .................................... G06K 9/00
[52] U.S. Cl. .................................... 382/14; 395/23
[58] Field of Search ............... 382/14, 15; 395/21, 395/23, 24

[56] References Cited

PUBLICATIONS

R. P. Lippmann, "An Introduction to Computing with Neural Nets", IEEE ASSP Magazine, Apr. 1987, pp. 4-22.
S. I. Gallant, "Optimal Linear Discriminants", IEEE proc. 8th Conf. on Pattern Recognition, Paris (1986), pp. 849-852.
M. Mezard & J. P. Nadal, "Learning in Feedforward Layered Networks: the tiling algorithm", J. Phys. A: Math. Gen. 22 (1989), pp. 2191-2203.
Diday et al., éléments d'analyse de données, pp. 167-207 (no date).
Koutsougeras et al., "Training of a Neural Network for Pattern Classification Based on an Entropy Measure" IEEE Int. Conf. on Neural Networks, San Diego Calif. (1988) pp. I-247 through I-254.
Meir et al., "Iterated Learning in a Layer Feed-Forward Neural Network", Physical Review A, vol. 37, #7 pp. 2660-2668 (Apr. 1, 1988).

*Primary Examiner*—Leo H. Boudreau
*Attorney, Agent, or Firm*—David Schreiber

[57] ABSTRACT

Classification procedure implemented in a tree-like neural network which, in the course of learning steps, determines with the aid of a tree-like structure the number of neurons and their synaptic coefficients required for the processing of problems of classification of multi-class examples. Each neuron tends to distinguish, from the examples, two groups of examples approximating as well as possible to a division into two predetermined groups of classes. This division can be obtained through a principal component analysis of the distribution of examples. The neural network comprises a directory of addresses of successor neurons which is loaded in learning mode then read in exploitation mode. A memory stores example classes associated with the ends of the branches of the tree.

9 Claims, 5 Drawing Sheets

CLASSIFICATION PROCEDURE IMPLEMENTED IN A HIERARCHICAL NEURAL NETWORK, AND HIERARCHICAL NEURAL NETWORK

The invention relates to a classification procedure implemented in a tree-like neural network, comprising learning steps in the course of which the neural network determines synaptic coefficients in order to classify a group of examples divided over several classes.

It also relates to a neural network implementing this procedure.

Neural networks find their applications in classification problems in particular for character and shape recognition, speech-signal processing, image processing, information compression, etc.

Neural networks are made up of non-linear automatons generally interconnected by synapses to which synaptic coefficients are assigned. They permit processing of problems which conventional sequential computers do with difficulty.

The two most widespread types of network are:
fully connected so-called Hopfield networks
layered networks : the neurons are grouped
in successive layers, and each neuron is connected to all the neurons of the following layer. In the most general organisation the information passes from (passive) input terminals to an (active) input layer then successively to each (active) hidden layer then to an (active) output layer. In the most simplified organisation the information passes from (passive) input terminals to a single (active) layer. The input information is formed from a sequence of vectors having several components.

These systems are capable of learning by example or of self-organising. The very long computation times on a sequential computer can be considerably reduced by parallelising the operations which comprise learning phases and solution phases.

In order to effect a given processing, neural networks must first learn to effect it. This phase, called learning, makes use of examples. For numerous algorithms, the results that should be obtained at output with these examples are generally known in advance. Initially, the neural network which is not yet adapted to the intended task will deliver erroneous results. An error between the results obtained and those that ought to have been obtained is thus determined and, from a modification criterion, the synaptic coefficients are modified in order to permit the neural network to learn the chosen example. This step is repeated over the batch of examples considered as necessary for an adequate learning by the neural network. Learning algorithms divide up into two classes:

local learning, in which the modification of a synaptic coefficient $C_{ij}$ linking a neuron j to a neuron i depends only on the information localised on the neurons i and j, non-local learning, in which it depends on information situated throughout the network. This latter learning is for example that of error feedback in layered networks.

Information on various types of neural networks can for example be found in the article by R. P. Lippmann, "An introduction to computing with neural nets", IEEE ASSP Magazine, April 1987, p. 4 to 22.

In these neural networks the organisation of the structure is fixed (layered or fully connected) and the links between neurons are fixed in advance.

The objective of the learning which is then effected is to seek an optimal structure by operating on various architectures, then to make an a posteriori choice.

An algorithm which permits determination of the architecture in the course of learning has been proposed by: M. MEZARD and J. P. NADAL in "Learning in Feedforward Layered networks: the tiling algorithm", J. Phys. A : Math. Gen. 22 (1989), p. 2191-2203.

For this purpose, the learning is initialised by optimising the synaptic coefficient of a first neuron assigned to a first layer and, if this neuron is insufficient to accomplish the classification task, an additional neuron is added into the current layer or into the following layer which is thus initialised. This approach permits learning of the architecture and the parameters of layered networks (multilayer perceptrons) by separating the outputs into two classes. However, in user mode these networks are not optimal in terms of computation time since all the neurons must be systematically updated.

Neither are they optimal in compactness since use must be made of a much higher number of neurons than the theoretical number of neurons. Moreover, in the case of evolutionary problems, it is necessary to recommence the totality of the learning when the input parameters are only slightly modified, for example when, in a classification problem, a class is added to the already learnt classes.

Furthermore, a neural network is known having a tree-like structure, described in the article: "Training of a neural network for pattern classification based on an entropy measure", by C. KOUTSOUGERAS and C. A. PAPACHRISTOU in IEEE International Conference on Neural Networks, San Diego Calif., July 1988, p. 1-247; 1-254.

Such a structure is adapted to perform Classifications by distinguishing two classes in the input data. A neuron is made of a cell (with its synaptic coefficients and its non-linear function) having inputs, two complementary outputs and a validation input E. When the first neuron created cannot perform the complete separation of the two classes, two successor neurons are systematically generated, the validation inputs E of which are respectively controlled by the two complementary outputs of the first neuron. This neural network is constructed by adding successive rows of neurons. In fact, the article specifies that: each output of each unit (neuron) is connected to the input E of another unit (neuron) of the next row. With a first rank made up by the first neuron (father neuron) the second rank is formed by all the son neurons, the third rank is formed by all the grandson neurons and so on. Hence, a layer of order k encompasses $2^{k-1}$ neurons. A complete binary tree is thus created. On the other hand, this neural network is intended to perform a classification between two classes only. In the space of its inputs, this neural network solves a topological problem, that is to say it distinguishes the zones of the space belonging to one class from the zones belonging to the other class. This document does not teach how to operate in order to classify input data divided over more than two classes.

The problem posed is therefore to design a neural network architecture which processes multi-class classification problems and which is more compact than the known layered architectures. It is required of this architecture that it operate very rapidly. It is also required of this architecture that it be more flexible than the known architectures and be readily evolutionary.

The solution consists in a classification procedure which performs classifications over more than two classes in which the learning comprises the following steps:

A - division of the classes relating to the examples to be classed in accordance with two subgroups of classes, B - computation of the synaptic coefficients of a neuron in order that it tend to distinguish, from the group of examples, two subgroups of examples approximating as well as possible to the division in accordance with the said two subgroups of classes, C - test of the homogeneity of the subgroup of examples distinguished, in order to determine whether they encompass a single class, D - when a neuron distinguishes a single class, storage of the address of the said neuron and recording of the said single class, E - and when a neuron distinguishes an inhomogeneous subgroup, division of each homogeneous subgroup of examples into two new subgroups of classes by re-starting the procedure at step A, then generation of a successor neuron for each inhomogeneous subgroup of examples and recording of the address of the said successor neuron, the procedure being repeated until the new subgroups of examples distinguished by the successor neurons all correspond to a homogeneous class subgroup.

This procedure refers to a hierarchical neural network in which the interconnection of the neurons and the updating of the synaptic coefficients follow a path in a decision tree. With a tree-like-organised neural network, all the neurons operate in the space of the inputs (all the neurons which are created receive all the components of the input vectors). The architecture which results therefrom is very compact. The learning periods are much reduced since the architecture may be very close to the optimal architecture according to the choice of the desired predetermined subclasses processed by the neuron. In particular, with a first rank made up by the first neuron (father neuron), the second rank may not contain all the son neurons, and similarly for the other ranks, that is to say that the neurons which are not actually useful for the separation of the classes are not created.

In execution phase, the execution periods are also much reduced since, for a given class, they implement solely the neurons necessary in the distinguishing of the said class. In fact, it is the result delivered by a neuron which determines the address of the successor neuron to be made to act. This address has been stored during learning. This is different from the situation treated in the article by G. KOUTSOUGERAS et al. in which the addresses of the neurons are not stored, since systematically for a rank k, the totality of the $2^{k-1}$ neurons is created.

In order to effect the learning the synaptic coefficients of a father neuron are computed in order to distinguish, in a group M of examples a particular subgroup of classes P.

When for example the group M of examples covers classes A, B, C, D, the distinguishing can consist in distinguishing a subgroup $M+^1$ which isolates one of the classes, for example the class B. In this case the complementary subgroup $M-^1$ is made up from the other classes A, C, D.

It is also possible for each one of the classes A, B, C, D to previously determine an error criterion on the ability of the neuron to isolate it, then to select the class having the smallest error criterion, in order to implement the procedure.

This distinguishing of the examples into two subgroups, performed by a neuron, can also be effected in order to tend to conform with a division of the classes effected by a principal component analysis of the distribution of examples, by performing the division into two groups relative to the centre of gravity of the distribution of examples.

The particular class which the neuron has to distinguish can also be determined from prior learnings performed on layered networks. In this situation such a layered neural network has adapted its synaptic coefficients for the basis of multi-class examples. The first layer which operates on the input potentials acts as a separator of classes. The neuron which performs a distinguishing most closely approximating to the particular desired division can thus be selected in this first layer. In this case, the initial synaptic coefficients of the neuron are determined from a layered neural network by selecting therein the synaptic coefficients of a neuron which distinguishes a class best approximating to the said particular class.

Instead of isolating a predetermined class it may be wished to perform a different division, for example to balance the population of the examples in the two groups of examples separated by the separator. It is then the synaptic coefficients of the best adapted separator neuron of the layered neural network which will be used to undertake the training of the relevant neuron of the tree.

Advantageously, the satisfactory results obtained in a preceding architecture are thus exploited in order to construct a more compact, more rapid and more powerful tree-like architecture.

The separation effected by placing in the group $M+^1$ the particular class P which it is desired to isolate with the aid of the neuron can be only imperfectly obtained when the classes of examples are not linearly separable. Thus, examples having the same class as the particular class P may find themselves in the complementary subgroup $M-^1$ after distinguishing by the first neuron.

The group $M+^1$ and the complementary group M are then homogeneity-tested in order to determine whether they encompass a single class. If one or other of these groups is homogeneous, the distinguishing of this group is completed. If one or other of these groups is inhomogeneous, for each group a successor neuron is generated which distinguishes two new groups in the inhomogeneous group. For this purpose, the procedure computes synaptic coefficients for this successor neuron which performs this distinguishing according to a dichotomy criterion. This distinguishing operates on the input examples (vectors) which have generated the relevant inhomogeneous group. This procedure of dichotomy of the examples and of successor neuron generation is repeated over the successive generations.

The training of each neuron performing a separation over two subgroups may exhibit several variants. Preferably, the Pocket algorithm used by M. MEZARD and J. P. NADAL, and described by S. GALLANT in "Optimal Linear Discriminants", IEEE proc. 8th. Conf. on Pattern Recognition, Paris (1986), is implemented. This Pocket algorithm can be used to perform the separation effected by each neuron.

It is also possible for each neuron to use a "perceptrons" training criterion which re-updates the synaptic coefficients from errors which characterise the deviation, for an arbitrary example, between a result obtained at the output of the neural network and the expected result. These training criteria are known to those skilled in the art.

Thus, in order to effect the training of an arbitrary neuron, the computation of its synaptic coefficients implements either the "Pocket" algorithm, or a "Perceptron" type learning rule, or a Hebb type learning rule (see R. P. LIPPMANN already cited and R. MEIR and E. DOMANY in "Iterated Learning in a layered Feed-Forward Neural Network" Phys. Rev. A, vol. 37, no. 7, 1988, p. 2660).

The invention also relates to a neural network implementing the procedure.

The neural network is firstly constructed according to a tree-like architecture, then it is used to perform classification tasks. The branches of the tree are then traversed as a function of their construction, the addresses of the successive neurons being stored in the course of training. The successor neuron depends on the result delivered by a preceding neuron. It is therefore necessary that a memory permits traversal of the tree as a function of the result obtained at the output of each neuron. For this purpose, the neural network is equipped with a memory which stores a directory of addresses which, according to the result obtained on an arbitrary neuron, implements a neuron following according to a tree-like organisation. With the selection of the examples processed by each neuron able to be different for each neuron as a function of the result of the preceding neuron, the neural network comprises means which permit selection of the examples to be processed by each successor neuron.

It is also possible for the neural network not to be designed to itself effect the learning, but for it to be able to perform only classification tasks proper (execution) for which it will have been either designed or programmed. For this purpose, the number of neurons, their synaptic coefficients, the order of succession, the number and the types of classes will be fixed. The invention is then notable in that it relates to a neural network comprising input terminals which receive vectors of data words to be classified, neurons which are linked to the input terminals, synaptic coefficients which define the link forces between the neurons, the neurons being interconnected according to a tree-like organisation, the neurons delivering two-state results, which is characterised in that it performs the classification of multi-class data words, the number of neurons, their synaptic coefficients, the order of succession of the neurons, the classes to be distinguished and their number being previously determined by a learning method specific to the classification to be effected, the said order of succession being stored in a first storage medium which is addressed by the said neuron result states, the said classes to be distinguished being stored in a second storage medium, a host computer testing the homogeneity of the results delivered by each neuron, and when homogeneity is satisfied, the host computer addresses the second storage medium in order to deliver the class distinguished, and when homogeneity is not satisfied, the host computer addresses the first storage medium which gives the address of the successor neuron.

Figure 1B:
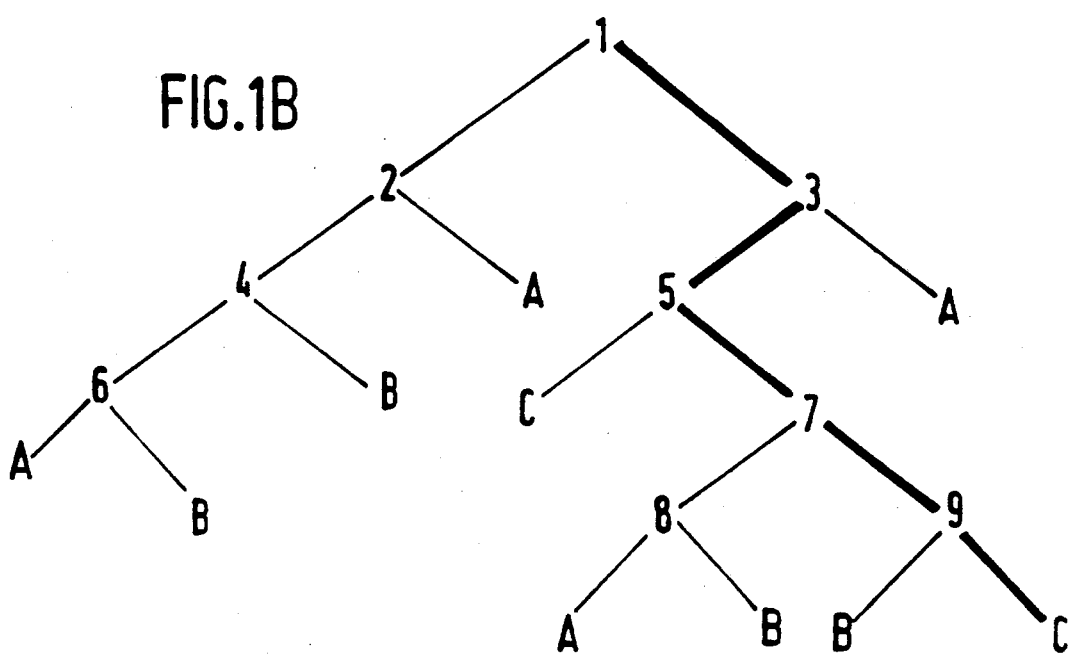
Figure 2:
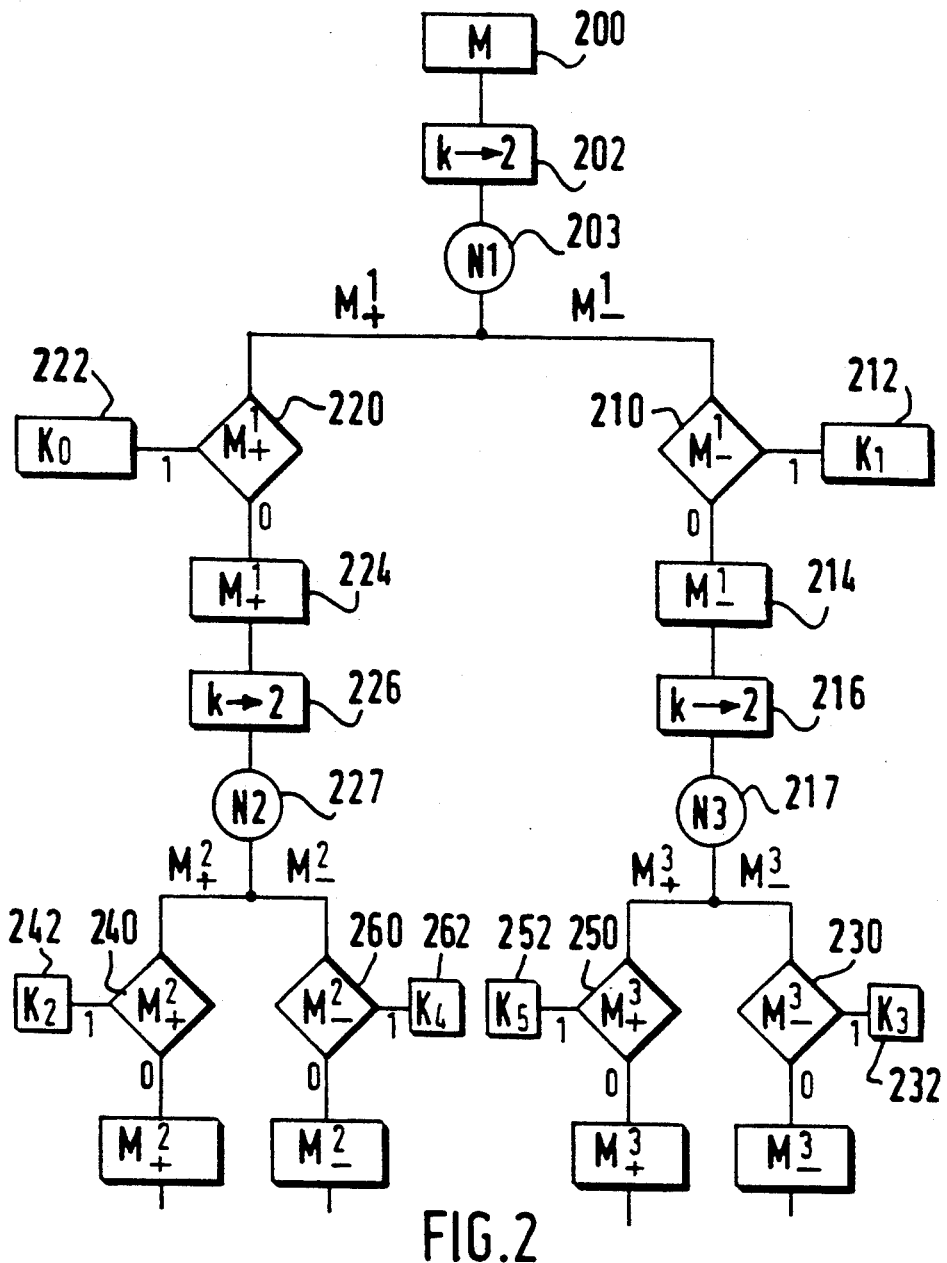
Figure 3:
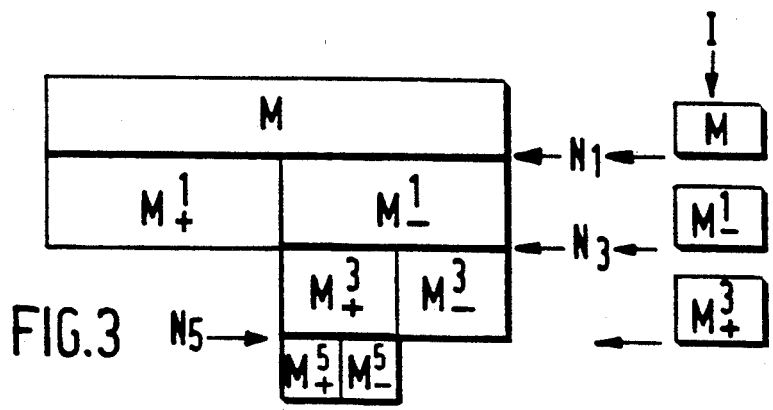
Figure 4A:
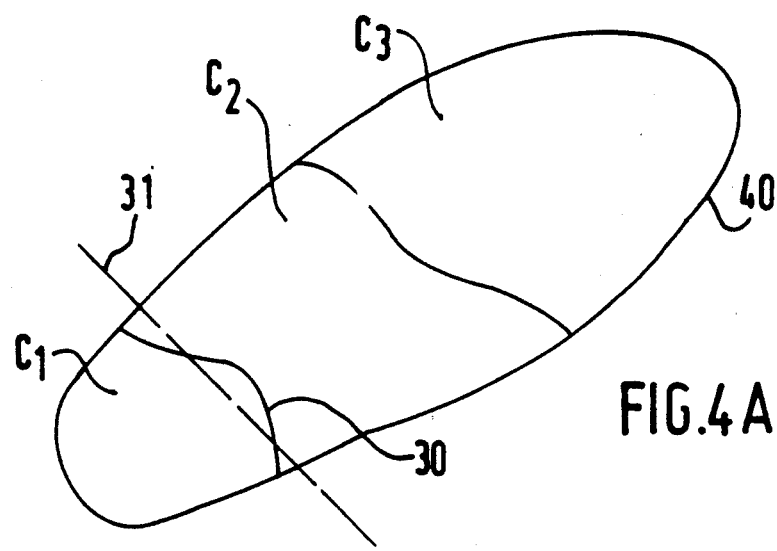
Figure 4B:
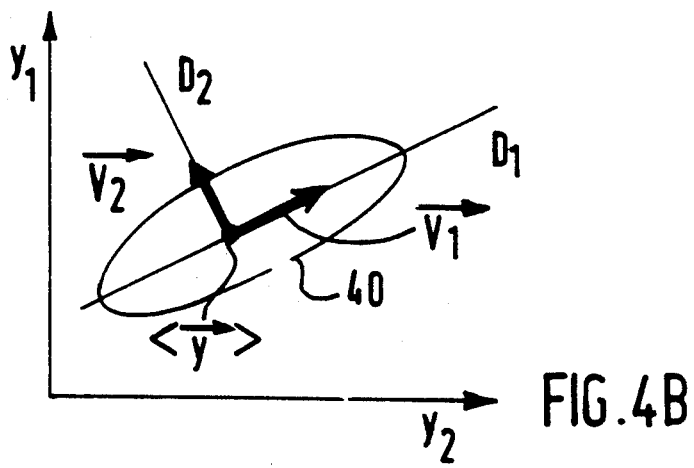
Figure 4C:
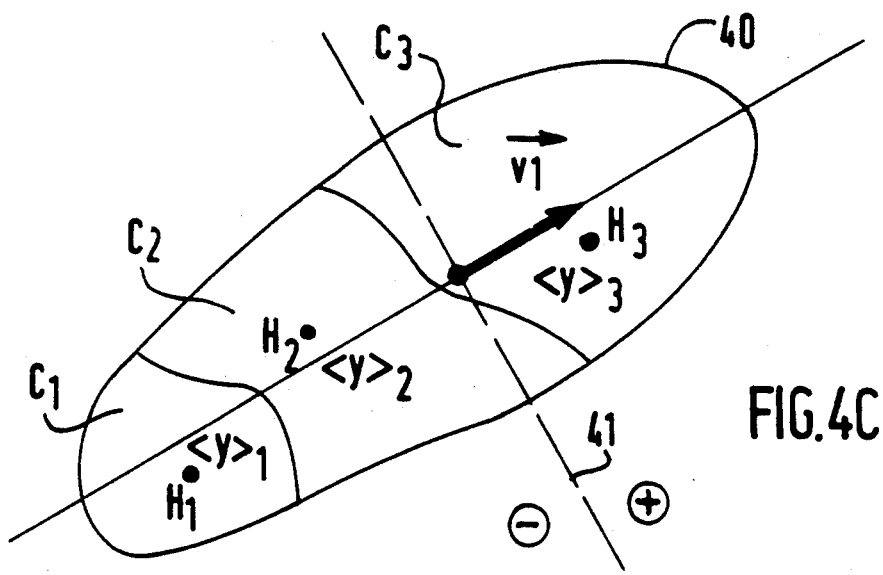
Figure 5:
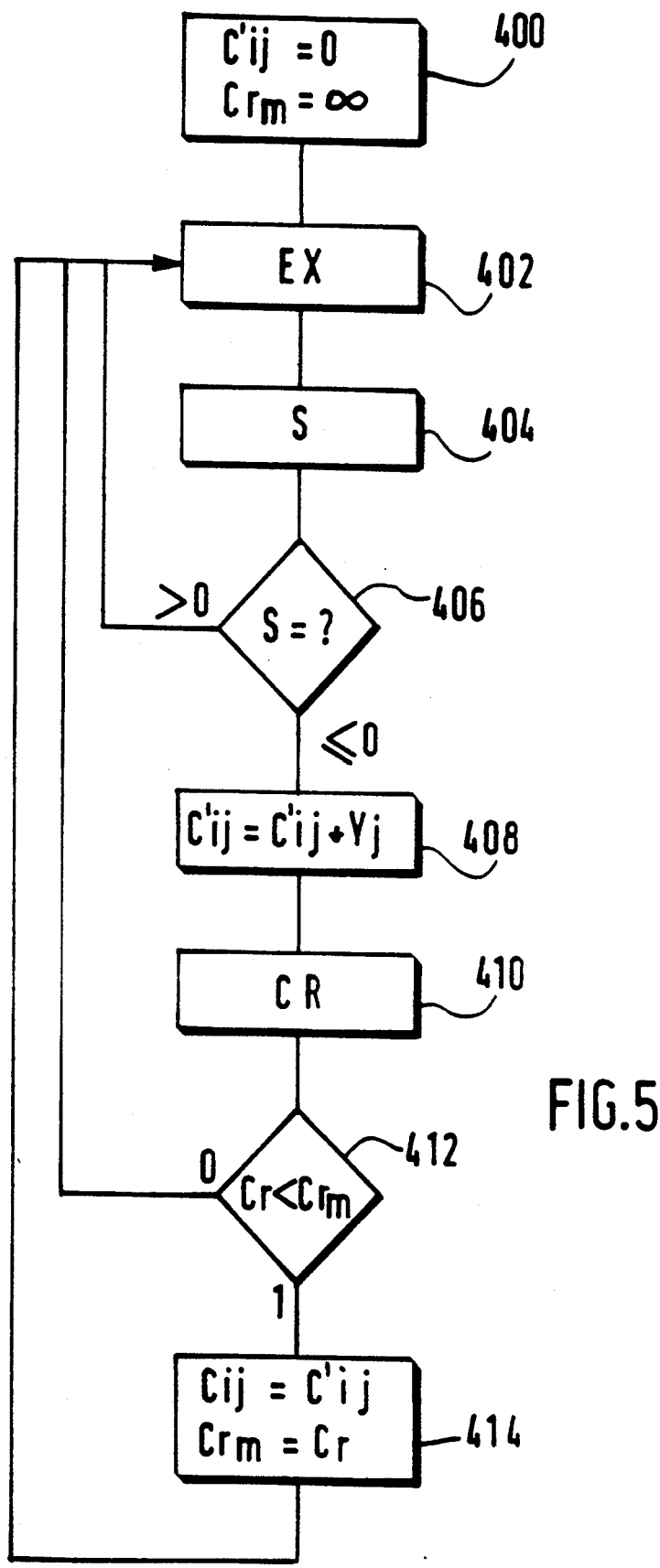
Figure 6:
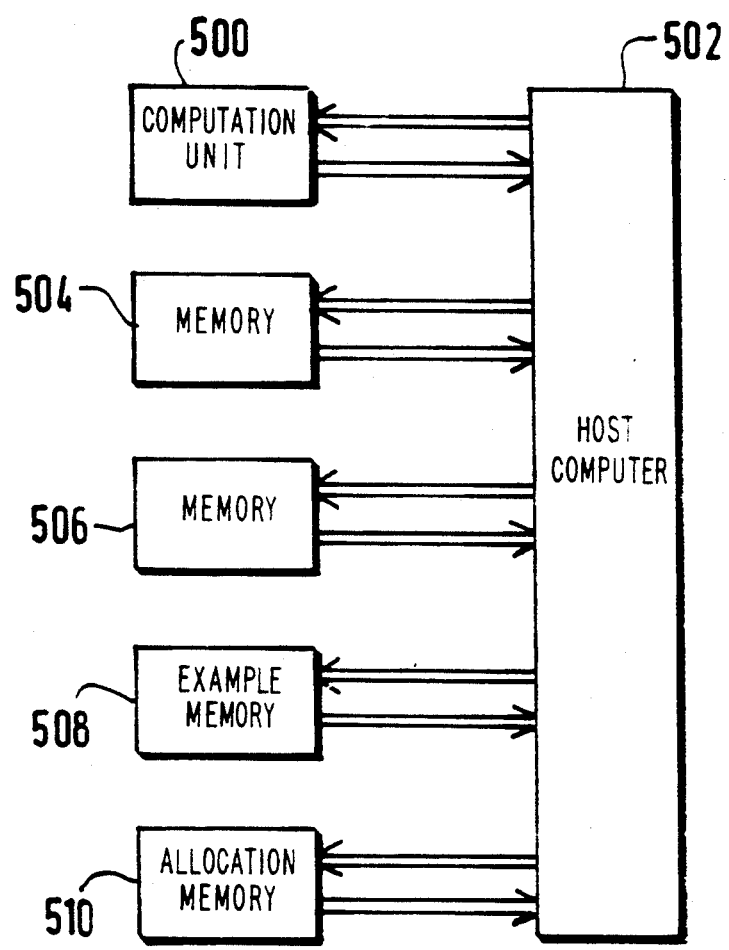

The invention will be better understood with the aid of the following figures given by way of non-limiting example, and which represent:

FIG. 1A, 1B: a representation in the space of the inputs of the mode of action of the separators in a basis of examples with three classes A, B, C and the tree structure which corresponds thereto;

FIG. 2: a flow diagram relating to a neural tree which indicates the mechanism of distinguishing of the classes and the relevant example subgroups;

FIG. 3: a representation of the separation of the examples;

FIG. 4A, 4C: two representations of two examples of division of the classes;

FIG. 4B: a representation of the principal components of a distribution;

FIG. 5: an algorithm example constituted by the Pocket algorithm permitting performance of the separation between two groups of classes, and FIG. 6: a scheme of a neural network organised like a neural tree.

FIG. 1A is a representation in the space of the inputs of the mode of action of the separators.

The situation treated comprises 3 classes A, B, C, divided over a group of examples.

In this figure, the separator 1 separates the space into two parts:

the upper part comprises a first subgroup of examples (classes A, B) and the lower part comprises a second subgroup of examples (classes A, B, C).

The successor separator 2 isolates the class A on the one hand and the other subgroups of examples (classes A, B) on the other hand.

Next must be added the separator 4, then 6, operating on the first subgroup of examples in order to perform the complete separation of the classes A and B.

Similarly for the second subgroup of examples, after the action of the separator 1, if it is desired to separate an example represented by the symbol X (class C) the separators 3, 5, 7, 9 for example must be brought in in order.

These same results are represented in tree form in FIG. 1B in which the same digits represent the neurons (separators) which perform the separation. The father neuron is neuron 1, the others being successor neurons. Thus, in the situation represented, the complete separation of the three classes requires nine neurons. The traversing of the tree in order to isolate the symbol X of the class C is represented by heavy lines in FIG. 1B. All the neurons are linked to input terminals which receive the components of the input vectors. Each neuron operates on the group/subgroup of examples/data determined by the result of the neuron which precedes it.

FIG. 2 represents a flow diagram relating to a tree-like structure in which various steps of the procedure appear. This procedure operates from a selection from a group M of examples (step 200) chosen to carry out a training of the neural network and adapt it to the processing of a defined task. By definition this group M of examples is inhomogeneous. Training must be understood here in a broad sense since it consists not only in determining the required synaptic coefficients (teaching the neural network) but simultaneously in determining the number of neurons required to accomplish this task. It is therefore also a question of determining the size which the neural network has to have.

The group M of examples is formed for example from k different classes. Step 202 consists in initially dividing the k classes into two subgroups of classes $G+^1$ and $G-^1$ so as to reduce the problem of classification of k classes to a problem of two subgroups of classes $G+^1$ and $G-^1$. In the course of step 203 the procedure determines the synaptic coefficients of a father neuron $N_1$ which operates on the set of the group of examples M. These synaptic coefficients are determined in order that the neural network tend to perform the distinguishing, among the group of examples M, of two subgroups $M+^1$ and $M-^1$ best encompassing the two initially divided subgroups of classes $G+^1$, $G-^1$. The training mechanism which permits determination of the synaptic coefficients is preferably effected by the Pocket algorithm described hereinafter. Under these conditions, the training proves to be optimal both in respect of the execution period and the hardware required to implement this training. The output from the neural network is analysed in the form of the correct assignment or otherwise of each class to the intended subgroup. To fix ideas, it may for example be sought to isolate a class C $(G+^1=C)$ in a group of examples which comprises several classes A, B, C, D. The subgroup of classes $G-^1$ is then formed by the group of examples M from which the subgroup of classes $G+^1$ has been extracted. The training of the father neuron will thus tend to make $M+^1$ correspond with $G+^1$ and $M-^1$ with $G-^1$.

With the classes A, B, C, D not being linearly separable a priori, the subgroup $M-^1$ thus separated may itself also comprise elements of class C. Other more complex divisions can be subjected to the action of the father neuron as is discussed further on.

The examples generating the subgroups of examples $M+^1$ and $M-^1$ are next processed separately. The homogeneity of $M+^1$ and of $M-^1$ are examined, steps 220, 210.

In fact, the father neuron has the task of distinguishing a predefined subgroup of classes. If the group of examples $M+^1$ (respectively $M-^1$) is homogeneous, that is to say if it contains only examples from the same class, these examples are thus distinguished, step 222 (respectively step 212) (classes $K_0$, $K_1$).

If the subgroup of examples $M+^1$ (respectively $M-^1$) is inhomogeneous, that is to say if it contains examples from different classes, the distinguishing over this inhomogeneous group of examples must be continued, step 224 (respectively step 214).

For this purpose, a division is performed of the subgroup of examples $M+^1$ into two subgroups of classes according to the same division mechanism described at step 202, by operating on the number of classes remaining in the subgroup of examples $M+^1$. A successor neuron $N_2$ (respectively $N_3$) is then added and a similar dichotomy mechanism is performed. At the output of the successor neuron, $N_2$ for example, are thus obtained the subgroups of examples $M+^2$ and $M-^2$ which are themselves tested (steps 240, 260) as regards their homogeneity in order to determine whether or not they isolate classes of examples (classes $K_2$, $K_4$) (steps 242, 262). An identical process operates at the output of the successor neuron $N_3$ (steps 250, 230, 252, 232). The procedure according to the invention is completed when all the examples of the group M have been thus processed and each isolated subgroup of examples contains only examples belonging to the same class. The number of neurons and their synaptic coefficients are thus determined by the procedure itself and the training operation is completed for this group of examples. The neural network can then be exploited in order to perform classification tasks.

FIG. 3 is another representation of the separation steps performed by the procedure according to the invention. On the inhomogeneous group M of examples, the father neuron $N_1$ (represented by a heavy line) effects the distinguishing according to the subgroups of examples $M+^1$ and $M-^1$. It is assumed in this representation that the subgroup of examples $M+^1$ is homogeneous and contains a single class. It is also assumed that the subgroup of examples $M-^1$ is inhomogeneous. The successor neuron $N_3$ (heavy line) separates $M-^1$ into two subgroups of examples $M+^3$ and $M-^3$. The subgroup $M-^3$ is homogeneous and the subgroup $M+^3$ is inhomogeneous. The latter is separated by the successor neuron $N_5$ (heavy line) into two subgroups of examples $M+^5$ $M-^5$ which are homogeneous in the situation represented. The classification procedure is then terminated and the tree-like neural network can be used to perform classifications on other groups of data. In FIG. 3 the column I indicates the group M or the subgroups of examples $M-^1$, $M+^3$ on which the distinguishing carried out by the relevant successor neuron operates, that is to say after extraction of the homogeneous subgroups or groups distinguished by the preceding subgroup or group.

From the examples, the father neuron tends to distinguish two subgroups of examples close to the predefined division.

A first example of division of the classes into two subgroups of classes has already been described, isolating a particular class from the other classes forming amongst themselves the set of the classes of examples.

FIG. 4A constitutes a representation of a group M of examples 40 formed from classes $C_1$, $C_2$ and $C_3$. The boundary of class $C_1$ is formed by the curve 30. The computation of the synaptic coefficients of the neuron will consist in best isolating the class $C_1$ and in placing a separator formed here by the straight line 31.

A second example of division can consist in previously computing an error criterion for each of the classes of examples. An error criterion evaluating the best division is then defined. It is the particular class thus isolated by this best division which is selected to effect the training of each neuron so as to determine its synaptic coefficients.

The first and the second example of division can lead to trees of large size (large number of neurons) and of large depth (large number of neurons to be updated) which can constitute a handicap. For this reason other types of division may be preferred to them.

A third example of division towards which the neuron must tend can consist in using a principal component analysis of the distribution of examples. Principal component analysis is a statistical method which permits a set of N vectors $\bar{y}^\mu$ (points in a d-dimensional space) to be described with the aid of a mean vector $<\bar{y}> = 1/N \Sigma y^N$ with d principal directions and the d corresponding variances $\sigma^2$. The method is detailed in "Eléments d'Analyse de Données [Elements of Data Analysis]" by E. DIDAY, J. LEMAIRE, J. POUGET and E. TESTU, Publisher Dunod (1982), p. 167.

The simple case of FIG. 4B represents a distribution 40 in a two-dimensional space with a ratio of the standard deviations $\sigma 1/\sigma 2$ substantially equal to 3. For this distribution, a mean $<\bar{y}>$ and principal components $\bar{V}_1$, $\bar{y}_2$ are defined along proper directions $D_1$, $D_2$. If the principal components are classed by decreasing variances the first proper direction indicates the direction along which the norm of $(\bar{y}^\mu - <\bar{y}>)$ varies the most with the example $\mu$. When there is available a set of examples $\vec{y}^\mu$ allocated to the classes $C_1, C_2, \ldots, C_k$, to which it is wished to apply a linear separator (neuron) in order to progress in the classification with k classes, it seems advantageous to separate the k classes into two disjoint groups $G_+/G_-$ in the following way:

i) the mean $<\vec{y}>$ and the first principal component $\vec{V}_1$ of the set of the examples $\vec{y}^\mu$ are computed, by carrying out for example a complete principal component analysis by computation and diagonalisation of the covariance matrix followed by the choice of the component with maximum variance, ii) the centres of gravity corresponding to each class C are computed:

$$<\vec{y}>_c = \frac{1}{N_c} \sum_C \vec{y}^\mu$$

where $\Sigma$ indicates a summation over the examples whose class is C, Nc the number of examples of the class C, iii) the classes whose centre of gravity satisfies:

$$S = \sum_{j=0}^{N} c_{ij} \cdot Y_j^\mu$$

are grouped into $G_+$ and the other classes into $G_-$.

The method of principal component analysis is illustrated by FIG. 4C for a three-class, two-dimensional distribution. The distribution 40 comprises the classes $C_1, C_2, C_3$ each having a mean value $<y>_1, <y>_2, <y>_3$ and a centre of gravity $H_1, H_2, H_3$. According to i) the computation of the mean and of the first principal vector determines $<y>$ and $\vec{V}_1$. According to ii) the computation of the centres of gravity associated with the classes determines $H_1, H_2, H_3$. The grouping of the classes according to iii) permits the three classes to be divided into two subgroups of classes with the aid of the separator 41.

In this case, the division of the examples into two subgroups of classes effects a division relative to an axis passing through the centre of gravity of the distribution of examples, perpendicular to a principal direction, the said centre and the said principal direction being determined during the principal component analysis. The essential advantage of this method relative to other choices (selection of a class for example) is that the linear separator will be more balanced, that is to say that it will separate the examples into two less different population sub sets.

A fourth example of division can consist in using results already known on a layered neural network. In fact, such a neural network which has already undergone training in order to adapt it to an identical or similar task possesses already determined synaptic coefficients. The input layer of such a layered neural network comprises neurons which also perform a separator function. In the group of examples M to be processed it is thus possible to determine in this input layer the neuron performing the separation into two subgroups which is closest to the desired division.

These four examples of division implemented by the neurons do not constitute a limiting list and other choices can be operated according to the invention.

The training effected by the neurons so as to determine their synaptic coefficients in order to best approximate to the desired subgroups of classes are preferably effected according to the Pocket algorithm used by M.

MEZARD and J. P. NADAL in "Learning in Feedforward Layered networks: the tiling algorithm", J. Phys. A: Math. Gen. 22 (1989), p. 2191-2203 and described by S. GALLANT in "Optimal Linear Discriminants", IEEE proc. 8th. Conf. on Pattern Recognition, Paris (1986).

For this purpose, for each example chosen at random, the potential of outputs of a neuron is computed. If this potential satisfies the stability criterion ($S \geq 0$) another example is chosen. If this potential does not satisfy the stability criterion ($S < 0$) new synaptic coefficients are computed which serve in the updating of the old synaptic coefficients only if they satisfy a minimal error criterion. All the examples are thus used to determine the synaptic coefficients of the relevant neuron, the "Pocket" algorithm converging to optimal synaptic coefficients in order to perform the dichotomy of the inhomogeneous class.

This algorithm (tiling) has been designed in order to construct a multi layer neural network by adding neurons until the code represented ($+/-;1/0$) by the units of the current layer are reliable, that is to say that two examples of different classes do not have the same code over the set of the relevant layer. Each layer is thus constructed from examples of the preceding layer, until a layer with a single neuron is obtained.

FIG. 5 represents the flow diagram of the Pocket algorithm which performs the separation of a group of examples into two groups.

For a given neuron its synaptic coefficients $C_{ij}$ are initialised to zero and a maximum error criterion $CR_m$ is initialised to a very high value (step 400). An example EX is randomly drawn (step 402), for which a stability value S is determined (step 404) such that:

$$S = \sum_{j=0}^{N} c_{ij} \cdot Y_j^\mu$$

where
i is the index of the neuron currently under analysis
j is the index of the neurons or of the inputs which are connected thereto
$Y_j^\mu$ is the j component of the $\mu$ example presented to the input of the neuron i.

This stability S is tested (step 406). If it is positive, the stability is sufficient and another example is chosen.

If this stability S is negative or zero synaptic coefficients $C'_{ij}$ are determined such that:

$$C'_{ij}(new) = C'_{ij}(old) + Y_j \text{ (step 408)}.$$

Each new synaptic coefficient $C'_{ij}$ thus determined must satisfy an error criterion CR (step 410) which determines for example the number of examples for which the stability is of the wrong sign. If this criterion CR is less than a maximum value $CR_m$ of the criterion (step 412), the synaptic coefficients $C'_{ij}$ determined serve in updating (step 414) the synaptic coefficients $C_{ij}$ previously stored.

Similarly, the maximum value $CR_m$ is updated. All the examples are thus successively used to compute, then possibly update, the synaptic coefficients of this neuron i. At the termination of this training, the separation performed by this neuron i is tested by determining for an example of a given group the result obtained (separation into two groups of classes: $+/-;1/0$). If the separation does not deliver homogeneous groups of classes another neuron is added into the layer and the Pocket algorithm is implemented again in the same way.

This algorithm can differentiate only two types of groups of classes +/− (or 1/0) obtained at the output of the neuron. It cannot therefore operate directly on a training examples divided over a larger number of classes A, B, C, D, etc.

The invention also relates to a neural network organised like a tree, a schematic representation of which is provided by FIG. 6. The network comprises a computation unit 500 which determines the output states $V_i$ of the neurons from input potentials $V_j$ according to:

$$V_i = \Sigma\ C_{ij} V_j$$

where $C_{ij}$ are the synaptic coefficients which link the neuron i to the inputs j (or neuron j).

This computation unit 500 operates according to the mechanisms known to those skilled in the art described for example in the article by R. P. LIPPMANN already cited.

During the training of an arbitrary neuron, its successor neuron will differ according to the result delivered by this arbitrary neuron. In order to use the neural network, it is therefore necessary to determine the successor neuron according to the result delivered by the arbitrary neuron. For this purpose, an address memory 504 receives an address corresponding to the said result and delivers in return a successor-neuron address.

During the training step proper the neurons are created as has previously been defined, the order of succession of the successor neurons is thus determined and the memory 504 is loaded. Thus, the neural network is equipped with a memory which stores a directory of addresses which, according to the result obtained on an arbitrary neuron, implements a neuron following according to a tree-like organisation. The addressing of any branch of the tree is thus carried out rapidly with little hardware. A class memory 506 stores the classes separated by the neural tree.

During the step of exploitation of the tree-like neural network, the memory is addressed by the results delivered by the neurons and provides in return the address of the N successor neurons. This exchange is effected through a host computer 502 which manages the set of exchanges of the various units amongst themselves and in particular the exchange of each group or subgroup which each neuron has to receive.

When an end of a branch of the tree is reached, the corresponding class is read from the class memory (506). Advantageously, this permits a determination of the homogeneous classes of examples to be rapidly performed. The examples are stored in an example memory 508. A memory 510 for allocating the examples permits selection of the subgroups of examples which have to be processed by a specified neuron. It is possible that the neural network has available a certain number of neurons from which the training method determines the neurons which will constitute the tree. However, it is also possible that the training method be implemented in separate hardware in order to determine the number of neurons, their synaptic coefficients, the order of succession of the neurons, the classes to be distinguished and their number. All these parameters are then used to construct the neural network dedicated to the classification task learnt. This neural network does not then have available training options, but solely that of classification (repetition of the method learnt). A tree-like network of this type may further more be determined from another training method.

We claim:

1. A method of classifying a group of non-homogenous data into K homogenous classes implemented in a neural network device including at least one processing element, having a classification coefficient, comprising the steps of:
   a) dividing said group of non-homogeneous data into two subgroups of data;
   b) generating a classification coefficient for said processing element to divide said group of non-homogeneous data in accordance with said two subgroups of data;
   c) testing the homogeneity of each of said two subgroups to determine if each subgroup contains only a single class;
   d) storing a location of said processing element and recording said homogeneous class of said group of data when said processing element distinguishes said single class;
   e) if said subgroup is non-homogeneous, dividing said homogeneous subgroup into two further subgroups by performing step a) and generating a second processing element for each non-homogeneous subgroup; and
   f) repeating steps a)–d) until said further subgroups of data are classified by each of said successive processing elements correspond to a homogeneous class.

2. The method of claim 1, wherein K is greater than 2.

3. The method of claim 1, wherein one of said subgroups contains only a single particular class.

4. The method of claim 2, further including the step of generating an error criterion for each of said K classes and wherein said single particular class has said smallest error criterion.

5. The method of claim 3, wherein the step of dividing is performed by a layered neural network.

6. The method of claim 1, wherein said the step of dividing includes dividing said group of nonhomogeneous data relative to an axis passing through a center of gravity of a distribution of said group of nonhomogeneous data perpendicular to a principal direction, said center of gravity and said principal direction being determined by a principal component analysis.

7. The method of claim 4, wherein the step of generating a classification coefficient includes determining an initial classification coefficient from a layered neural network by selecting said classification coefficient which best separates a class in accordance with said particular single class.

8. The method of claim 1, wherein the step of generating includes implementing one of a Pocket algorithm, a perceptron-type learning rule and a Hebb-type learning rule.

9. A neural network device for classifying a group of non-homogeneous data into three homogeneous classes, comprising:
   an input for receiving said non-homogeneous data;
   a first processing element layer including a processing element connected to said input, said processing element utilizing a classification coefficient for separating said group of nonhomogeneous data into two subgroups, one of said groups including data belonging to one homogenous class, another of said groups including non-homogeneous data;

a second processing element layer connected to said processing element in said first processing element layer, said second processing element for receiving said subgroups and separating said subgroup of nonhomgeneous data into two homogeneous classes; and means for validating whether said output of each of said processing elements is a homogeneous class.

* * * * *